United States Patent
Dunn Berger et al.

(10) Patent No.: US 8,706,972 B2
(45) Date of Patent: *Apr. 22, 2014

(54) DYNAMIC MODE TRANSITIONS FOR CACHE INSTRUCTIONS

(71) Applicant: International Business Machines Corporation, Armonk, NY (US)

(72) Inventors: Deanna Postles Dunn Berger, Poughkeepsie, NY (US); Michael F. Fee, Cold Spring, NY (US); Kenneth D. Klapproth, Austin, TX (US); Robert J. Sonnelitter, III, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,983

(22) Filed: Nov. 20, 2012

(65) Prior Publication Data

US 2013/0080708 A1 Mar. 28, 2013

Related U.S. Application Data

(63) Continuation of application No. 12/821,706, filed on Jun. 23, 2010.

(51) Int. Cl.
*G06F 12/08* (2006.01)
(52) U.S. Cl.
USPC ............ 711/140; 711/141; 711/E12.017
(58) Field of Classification Search
USPC .......... 711/140, 156, 169, 144, 145, E12.017, 711/141
See application file for complete search history.

(56) References Cited

U.S. PATENT DOCUMENTS

| | | | |
|---|---|---|---|
| 5,555,392 A | 9/1996 | Chaput et al. | |
| 5,781,753 A * | 7/1998 | McFarland et al. | 712/218 |
| 6,401,192 B1 | 6/2002 | Schroter et al. | |
| 6,487,640 B1 * | 11/2002 | Lipasti | 711/140 |
| 6,567,901 B1 | 5/2003 | Neufeld | |
| 6,871,267 B2 * | 3/2005 | Freerksen et al. | 711/146 |
| 7,559,062 B2 | 7/2009 | Code et al. | |
| 7,707,359 B2 | 4/2010 | Mesard et al. | |
| 8,209,493 B2 | 6/2012 | Rotithor | |
| 2002/0083299 A1 | 6/2002 | Van Huben et al. | |
| 2002/0116584 A1 | 8/2002 | Wilkerson | |
| 2004/0117441 A1 | 6/2004 | Liu et al. | |
| 2004/0215773 A1 | 10/2004 | Strait et al. | |
| 2005/0125079 A1 * | 6/2005 | Schreder et al. | 700/1 |
| 2005/0172082 A1 | 8/2005 | Liu et al. | |

(Continued)

FOREIGN PATENT DOCUMENTS

EP 1241580 A2 9/2002

*Primary Examiner* — Pierre-Michel Bataille
(74) *Attorney, Agent, or Firm* — Cantor Colburn LLP; John Campbell

(57) ABSTRACT

A method of providing requests to a cache pipeline includes receiving a plurality of requests from one or more state machines at an arbiter, selecting one of the plurality of requests as a selected request, the selected request having been provided by a first state machine, determining that the selected request includes a mode that requires a first step and a second step, the first step including an access to a location in a cache, determining that the location in the cache is unavailable, and replacing the mode with a modified mode that only includes the second step.

7 Claims, 5 Drawing Sheets

(56) References Cited

U.S. PATENT DOCUMENTS

2009/0216917 A1 8/2009 Shasha et al.
2009/0307035 A1 12/2009 Steinglass et al.
2010/0274962 A1 10/2010 Mosek et al.
2011/0320725 A1 12/2011 Dunn Berger et al.

* cited by examiner

DYNAMIC MODE TRANSITIONS FOR CACHE INSTRUCTIONS

CROSS-REFERENCE TO RELATED APPLICATIONS AND PRIORITY CLAIM

This application is a continuation of U.S. Non-Provisional application Ser. No. 12/821,706, entitled "DYNAMIC MODE TRANSITIONS FOR CACHE INSTRUCTIONS", filed Jun. 23, 2010, which is incorporated herein by reference in its entirety.

BACKGROUND

This invention relates generally to processing within a computing environment, and more particularly to dynamic mode transitions for cache instructions.

In computers, a cache is a component that improves performance by transparently storing data such that future requests for that data can be served faster. The data that is stored within a cache might be values that have been computed earlier or duplicates of original values that are stored elsewhere (e.g. main memory). If requested data is contained in the cache (cache hit), this request can be served by simply reading the cache, which is comparably faster. Otherwise (cache miss), the data has to be recomputed or fetched from its original storage location, which is comparably slower.

Cache operations in a shared cache may be performed by accessing a shared pipeline. A pipeline may be considered as a set of data processing elements connected in series, so that the output of one element is the input of the next one. An instruction pipeline may be used in a computing device to increase instruction throughput (the number of instructions that can be executed in a unit of time). The fundamental idea is to split the processing of a computer instruction into a series of independent steps, with storage at the end of each step. This allows the computer's control circuitry to issue instructions at the processing rate of the slowest step, which is much faster than the time needed to perform all steps at once. The term pipeline refers to the fact that each step is carrying data at once (like water), and each step is connected to the next (like the links of a pipe.)

To maximize the performance of a cache, requests accessing a shared cache pipeline will speculatively access the data from the cache when performing other steps of the operation, such as sending coherency updates to lower levels of the cache. This allows the request to quickly return cache data for cases where the coherency updates are unnecessary.

BRIEF SUMMARY

An embodiment of the present invention is directed to a cache that includes a memory portion configured to store data in cache lines and a cache pipeline configured to control access to the memory portion and a plurality of state machines configured to create cache pipeline access requests, the cache pipeline access requests including a mode that includes a first step and a second step, the first step requiring access to a particular cache line. The cache of this embodiment also includes a line store coupled to the cache pipeline and configured to store information about the availability of cache lines in the memory portion and an arbiter coupled to the cache pipeline, the line store and the state machines. The arbiter is configured to select one of the pipeline access requests received from the state machines, determine if the particular cache line of the first step of the selected cache pipeline access request is available and to change the mode of the selected cache pipeline access request to a mode that only includes the second step in the event the particular cache line of the first step of the selected cache pipeline access request is not available.

Another embodiment of the present invention is directed to a computer implemented method of providing requests to a cache pipeline. The method includes: receiving a plurality of requests from one or more state machines at an arbiter; selecting one of the plurality of requests as a selected request, the selected request having been provided by a first state machine; determining that the selected request includes a mode that requires a first step and a second step, the first step including an access to a location in a cache; determining that the location in the cache is unavailable; and replacing the mode with a modified mode that only includes the second step.

Another embodiment of the present invention is directed to a cache that includes an interleaved memory including a plurality of interleave sections and configured to store data. The cache of this embodiment also includes a cache pipeline coupled to the cache portion and configured to control access to the memory portion and a plurality of state machines configured to create cache pipeline access requests that includes a mode that includes a first step and a second step, the first step requiring access to a particular interleave section. The cache also includes an interleave manager coupled to the cache pipeline and configured to store information about the availability of interleave portions in the interleave memory and an arbiter coupled to the cache pipeline, the interleaved memory and the state machines. The arbiter is configured to select one of the pipeline access requests received from the state machines and to determine if the particular interleave portion of the first step of the selected cache pipeline access request is available and to change the mode of the selected cache pipeline access request to a mode that only includes the second step in the event the particular cache line of the first step of the selected cache pipeline access request is not available.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Figure 1:
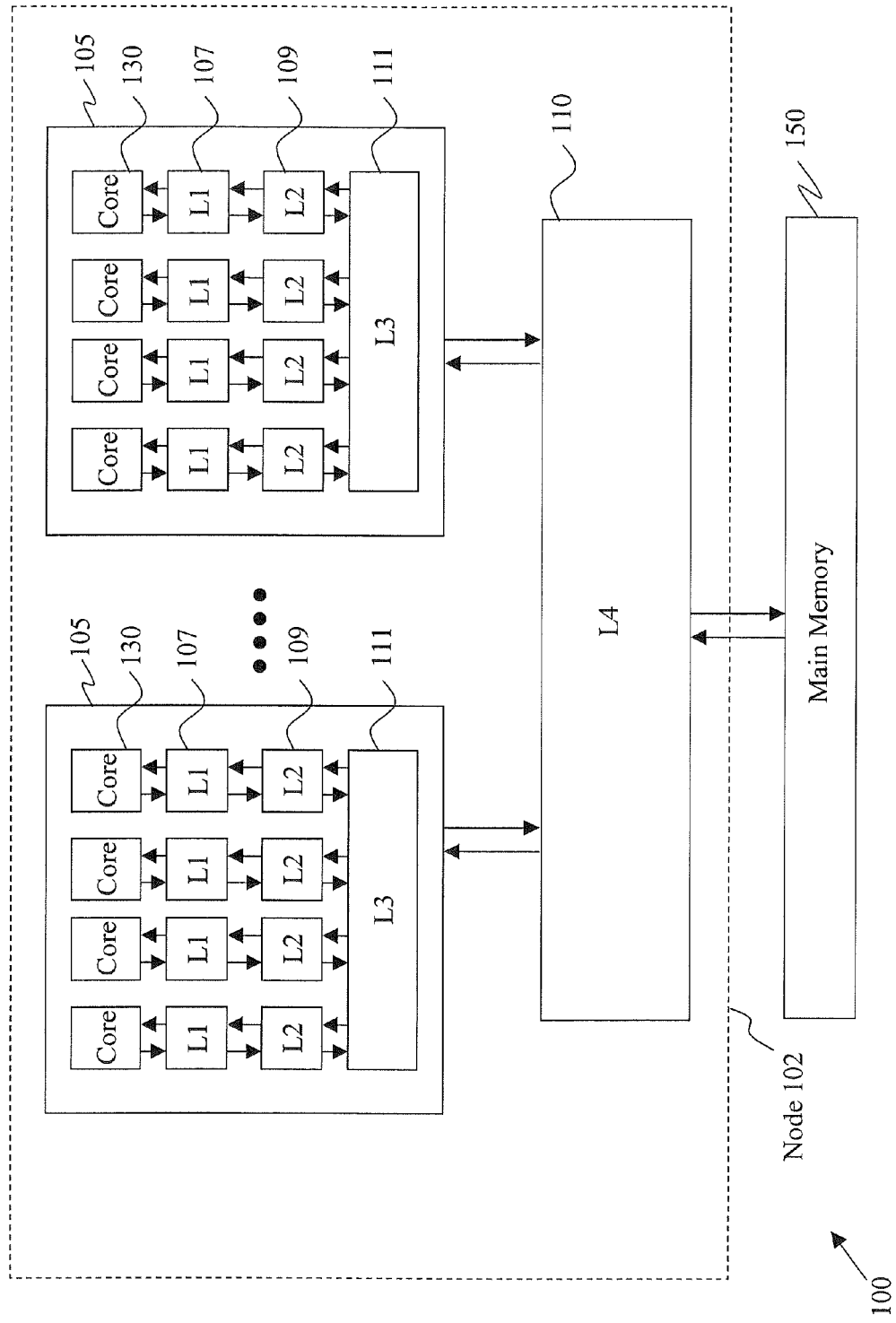
FIG. 1 depicts an example of system on which embodiments of the present invention may be implemented.

FIG. 1 illustrates an example of a computing system 100 according to one embodiment. The system includes one or more nodes 102. In one embodiment, the system 100 may include four nodes 102. In a computing system, multiple nodes 102 may be operatively connected to one another for communicating such as making and responding to requests, as understood by one skilled in the art.

Each node 102 includes one or more central processors 102. In one embodiment, each node 102 includes six central processors 105. The central processors 105 include one or more cores 130 that perform the reading and executing of instructions. In one embodiment, one or more of the central processors 105 include four cores 130. Of course, the central processors 105 could include any number of cores 130 that is greater than or equal to two.

Each core 130 is operatively coupled to its own L1 and L2 cache, 107 and 109 respectively. The L1 caches 107 are physically closest to the cores 130 and the L2 caches 109 are coupled to the L1 caches 107. Each L2 cache 109 in each central processor 105 is coupled to a single L3 cache 111. In this manner, the L3 cache 111 is shared by multiple L2 caches 107.

The node 102 also includes one or more L4 caches 110. The L4 caches 110 are operatively coupled to two or central processors 105. In this manner, the L4 caches 110 are shared by multiple L3 caches 111. The system 100 may also include main memory 150 operatively coupled to the L4 caches 110.

In one embodiment, the L3 caches 111 and L4 cache 110 are formed of embedded dynamic random access memory (DRAM) which is referred to as eDRAM. Of course, it is understood by a skilled artisan that any other types of suitable memory such as DRAM may be utilized. In one embodiment, the L2 caches 109 may be formed of static random access memory (SRAM).

In one embodiment, each individual central processor 105 is fabricated on its own separate chip, which includes the L1, L2, and L3 caches, and the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

In an exemplary embodiment, the L1 caches 107 are between 96 and 128 KB, the L2 caches 109 are 1.5 MB, the L3 cache is 24 MB and the L4 cache 110 is 192 MB. Of course other sizes could be utilized. In FIG. 1, the four different levels of caches (L1, L2, L3 and L4) are shown. Of course, such an organization of caches is exemplary only and the teachings herein may be applied to any situation where multiple requesters have access to a shared cache and the shared cache is one of a plurality of shared caches that have access to another shared cache.

Figure 2:
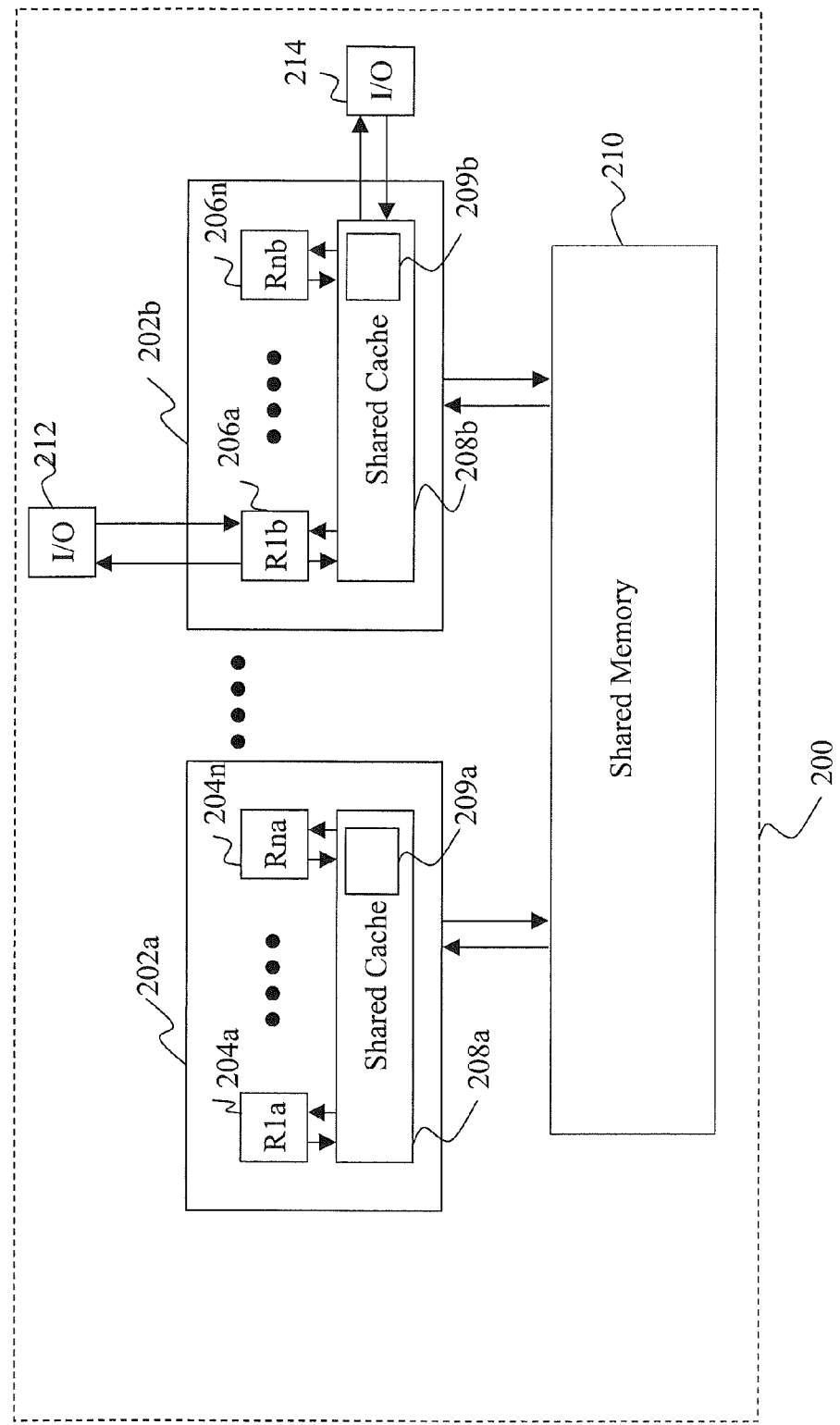
FIG. 2 depicts an alternative embodiment of a system on which embodiments of the present invention may be implemented.

FIG. 2 illustrates an alternative embodiment of a node 200. In this embodiment, the node 200 includes one or more central processors 202a . . . 202b. Each central processor 202 includes a shared cache 208 that includes a shared cache controller 209. The node also includes a shared memory 210 that may be accessed by each of the shared caches 208.

In general, the shared caches 208 receive requests for information (including both data and instruction requests) and if the requested data is contained in the shared caches 208 (cache hit), this request can be served by simply reading the shared cache 208. Otherwise, a cache miss occurs and the data is requested from shared memory 210. The determination of whether a cache hit or miss exists and the general operation of the shared cache 208 is controller by the shared cache controller 209.

In one embodiment, the shared cache controller 209 is implemented to include a pipeline and other elements. The shared cache controller 209 may also be responsible for coherency checking. In one embodiment, the shared caches 208 are store-in caches. Accordingly, in such an embodiment, each time data in the shared cache 208 is changed, the corresponding data in shared memory 210 is not updated.

In more detail, each shared cache 208 is coupled to two or more requesters. For example, shared cache 208a is coupled to requesters 204a . . . 204n and to shared memory 210, all of which may issue requests to the shared cache 208a. For example, shared memory 210 or requestors 204a . . . 204n may request a copy of a particular cache line contained in shared cache 208a. In one embodiment, the requestors 204a . . . 204n are caches. However, the requestors may include other types of device. For example, requestor 206a . . . 206n are coupled to shared cache 208b in central processor 202b. In one embodiment, requestor 206a is an I/O device controller and is coupled to an I/O device 212. The I/O device 212 may be located on a separate chip than central processor 202b. Of course, some I/O devices may include internal drivers and may be directly coupled to the shared cache 208b. One or ordinary skill will realize that other embodiments where a shared cache 208 is coupled to a shared memory 210 and to two or more other requestors, regardless of whether the other requestors are on the same chip as the shared cache, are within the scope of the present invention.

As discussed above, the L3 and L4 caches may store cache data in eDRAM. eDRAM takes longer to access and is busy longer than the SRAM used in prior systems. This increases the likelihood that a request will need to wait for the eDRAM to become available before entering the shared cache pipeline. Waiting longer to enter the shared cache pipeline delays sending coherency updates to lower level caches, which may reduce performance in cases where the updates are necessary.

Accordingly, embodiments of the present invention may be directed systems and methods that achieve the performance benefits of speculatively accessing the eDRAM whenever possible but to not cause the eDRAM availability to delay sending the required coherency updates to the lower level caches. This will ensure that the potential longest path of the operation is not made longer by waiting for EDRAM availability.

Figure 3:
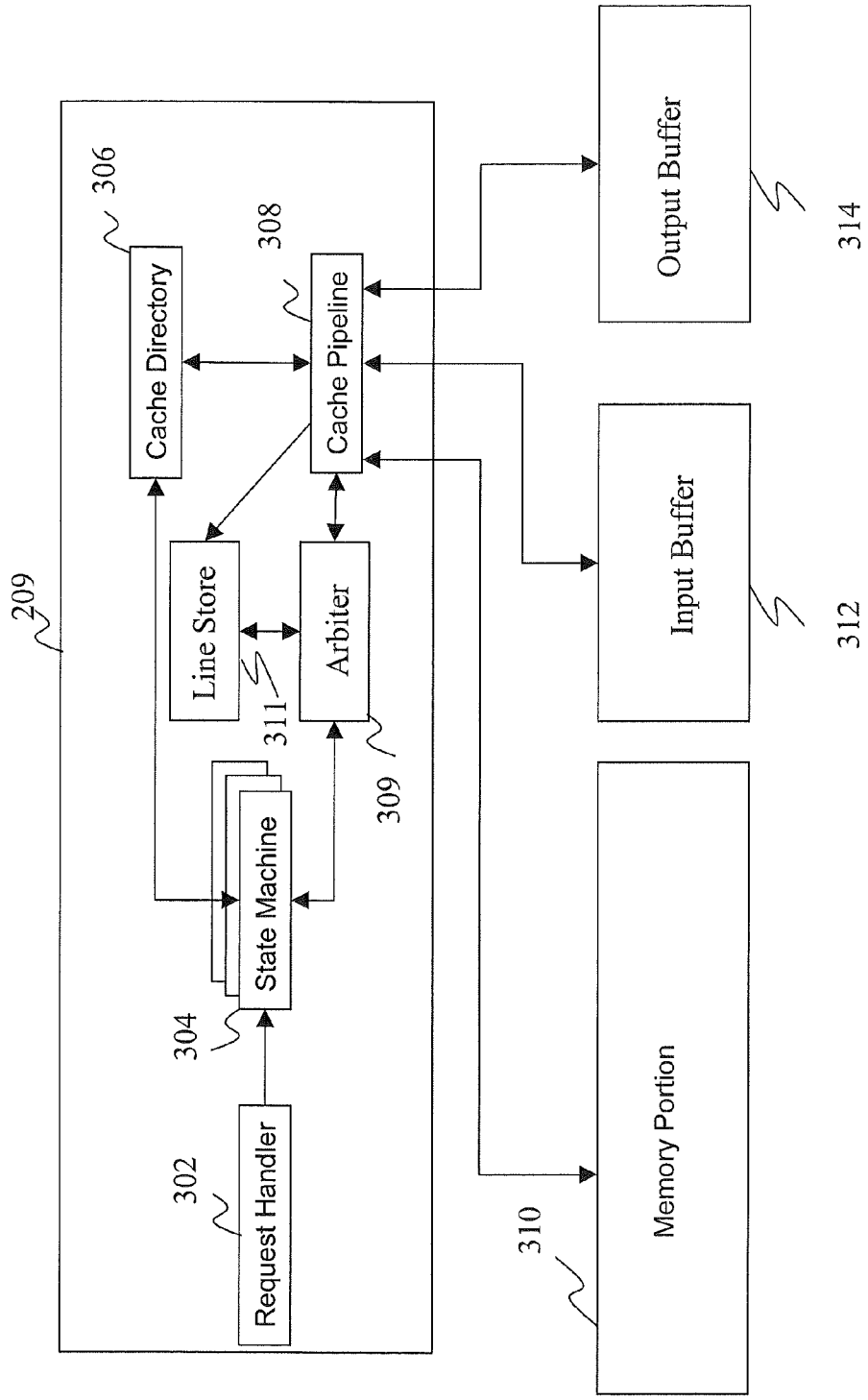
FIG. 3 depicts an example of a cache controller according to one embodiment.

FIG. 3 illustrates an example of the shared cache controller 209 that may be utilized to implement embodiments of the present invention. The shared cache controller 209 includes a request handler 302. The request handler 302 receives requests from multiple requesters as described above. For example, the request handler may receive requests from L2 cache 109 or L4 cache 110 (FIG. 1).

For each possible type of operation, the shared controller 209 may include one more state machines 304. For example, for each possible requester (e.g., L2 109, L4 110 or I/O devices 212 and 214) the shared controller 209 may includes one or more fetch state machines that provide data to an external location and one or more store state machines that bring data in from an external location. The external location could be another cache, main memory, or an I/O device, for example.

In operation, the request handler 302 assigns requests to a particular one of the state machines 304. The state machines 304 are coupled to and receive information from a cache directory 306. The cache directory 306 includes information about each cache line stored in the memory portion 310 of the cache in which the shared cache controller 209 is resident.

The state machines 304 divide the operation into a series of states. Typically, the state machines are implemented in hardware but may be implemented in software or in a combination thereof. Some of these states may cause a processing request to be generated. The process requests may include, for example, requests to send coherency updates, access cache data to provide to an external location or access the cache to store data received from an external location.

The state machines 304 are coupled to and provide the processing requests to an arbiter 309. The arbiter 309 assigns priority, based on arbitration algorithms, to certain processing requests. The processing requests are ultimately provided to cache pipeline 308.

The cache pipeline 308 is coupled to both the cache directory 306 and the arbiter 309. In addition, the cache pipeline 308 may be coupled to memory portion 310 in the shared cache 208 (FIG. 2) and an input buffer 312 and an output buffer 314 that, respectively, are utilized to receive data from and provide data to elements external to the shared cache 208. The memory portion 310 contains the cache lines contained in the cache. In one embodiment, each cache line is 256K bytes wide.

Access to the memory portion 310 (i.e., to the "cache lines" of the cache) is controlled by the cache pipeline 308. In general, the cache pipeline 308 causes data to be moved from the memory portion 310 to the output buffer 314 and from the input buffer 312 to the memory portion 310. In addition, the cache pipeline 308 may cause information in the output buffer 312 to be transferred to an external device and for data in the input buffer 312 to be transferred to the output buffer 314. Of course, the cache pipeline 308 may perform other duties as well. For example, the cache pipeline 308 may send coherency requests to other caches. In such a case, the cache pipeline may stall while waiting for a response from the other cache.

State machines 304 that need to access the memory portion 310 transmit requests to the arbiter 309 which grant access to the highest priority request. The particular request (e.g., instruction) would typically then enter the cache pipeline 308 with a mode field that indicates what actions are required for a particular pipe pass. For instance, one mode (having, for example, a mode code of 0x60) indicates the requestor would like to access data from the eDRAM cache and send a coherency update to the lower level caches. A second mode (having, for example, a mode code of 0x40) may indicate that the requestor only needs to send a coherency update. Other modes may be defined that cause the cache pipeline 308 to update the cache directory 306, send commands or responses to other caches and perform various other operations.

In addition to receiving a grant from the arbiter 309, it must also be determined if the desired location (cache line) in the memory portion 310 for the request is available. For example, the cache line may be being accessed by another instruction and, in such a case, the cache line is not available. Accordingly, the cache controller 209 may include a cache line store 311. The line store 310 is coupled to the cache pipeline 308 and the arbiter 309. The determination of whether the cache line is available may be made by the arbiter 309 based on information stored in the line store 311. In particular, the line store 311 keeps track of which lines are implicated by requests currently in the cache pipeline 308.

In shall be understood that the cache controller 209 may be responsive to a particular instruction set. In some cases, this instruction set may include instructions or modes where two separate but related steps to be performed. For example, the mode 0x60 may cause both a cache access and a coherency check to be performed. In one embodiment, the arbiter 309 may include a table of all of the modes.

In the event that it is determined that the cache line is available for access, the instruction is passed to the cache pipe line 308. However, in the event that the request has a mode that performs two steps, one of which requires access to an unavailable cache line, and the other is coherency step, according to one embodiment, the arbiter 209 causes the instruction to be converted to an instruction that only performs the coherency check. The arbiter 209 may then inform the requester that it needs to resubmit the access request. For example, assume that a request includes a cache access tied together with sending a coherency update (e.g., mode 0x60 describe above). In the event that the cache line is unavailable, if the request is passed to cache pipeline 308 it will cause a stall while the cache line is unavailable. The stall will hinder the shared caches ability to send the coherency update in a timely fashion. Thus, in this example, if the requestor attempts to enter the cache pipeline 308 in mode 0x60 and the cache line is unavailable, the arbiter 309 converts the instruction to mode 0x40 and it enters the cache pipeline instead of waiting for the line to become available. The state machine 304 may then create a new request with a mode that only requires the cache line access.

Figure 4:
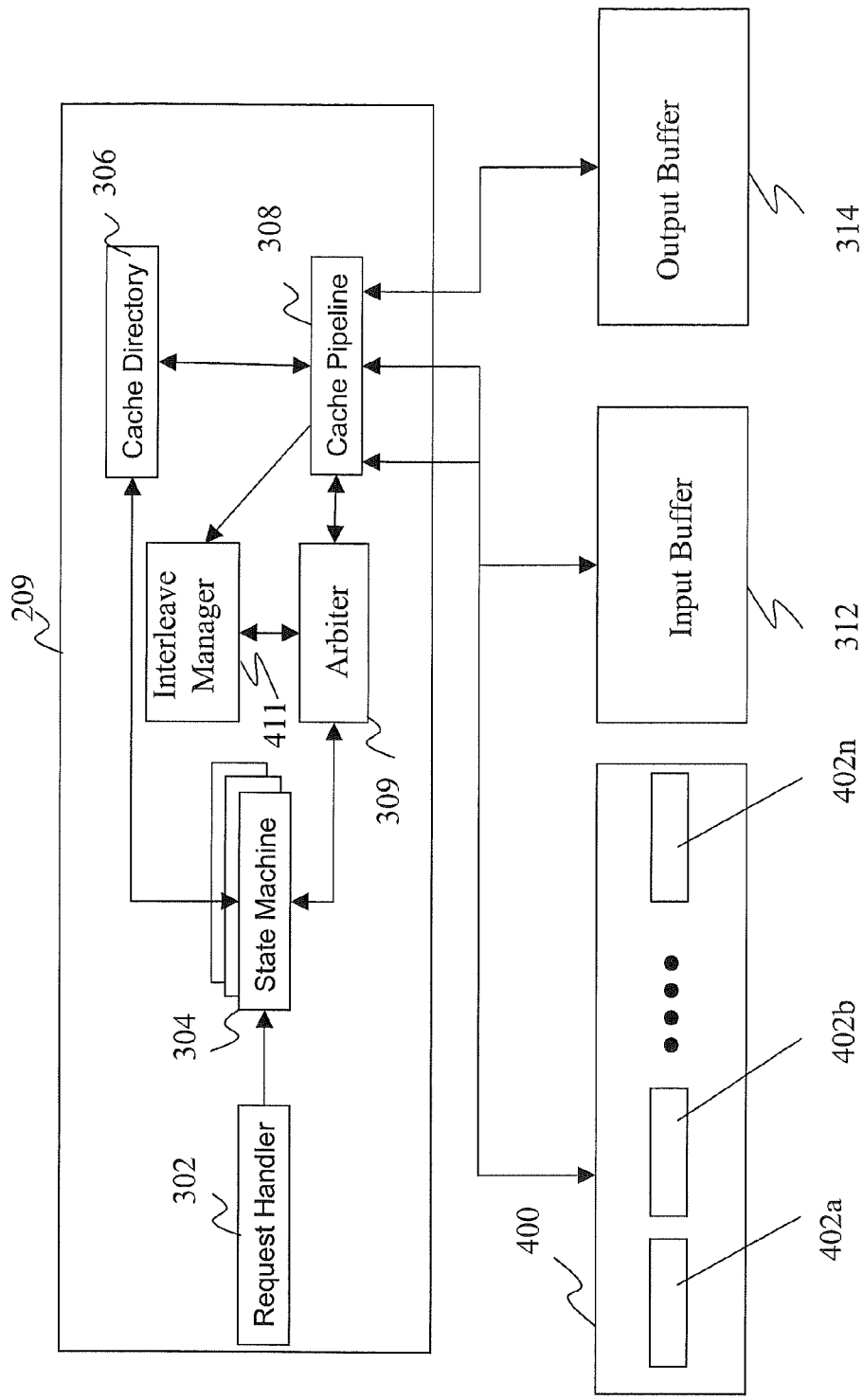
FIG. 4 depicts an example of a cache controller according to another embodiment.

FIG. 4 shows another embodiment of the cache controller 209 according to the present invention. In this embodiment, the cache controller 209 is coupled to an interleaved memory portion 400. The interleaved memory portion 400 includes a plurality of interleave portions 402a . . . 402n. In one embodiment, each cache line is distributed over 8 interleave portions. In one embodiment, each cache line is 256K bytes wide and each interleave portion is 32K bytes wide.

In this embodiment, the cache controller 209 includes an interleave manager 411 that replaces the line manager 311 of FIG. 3. The interleave manage 411 operates in substantially the same manner as the line manager 311 except that it keeps track of the availability of each interleave portion that is being used or that will be used by a request currently in the cache pipeline 308. If a selected request includes a step requiring access to an unavailable interleave portion 402, the mode is changed in the manner described above.

Figure 5:
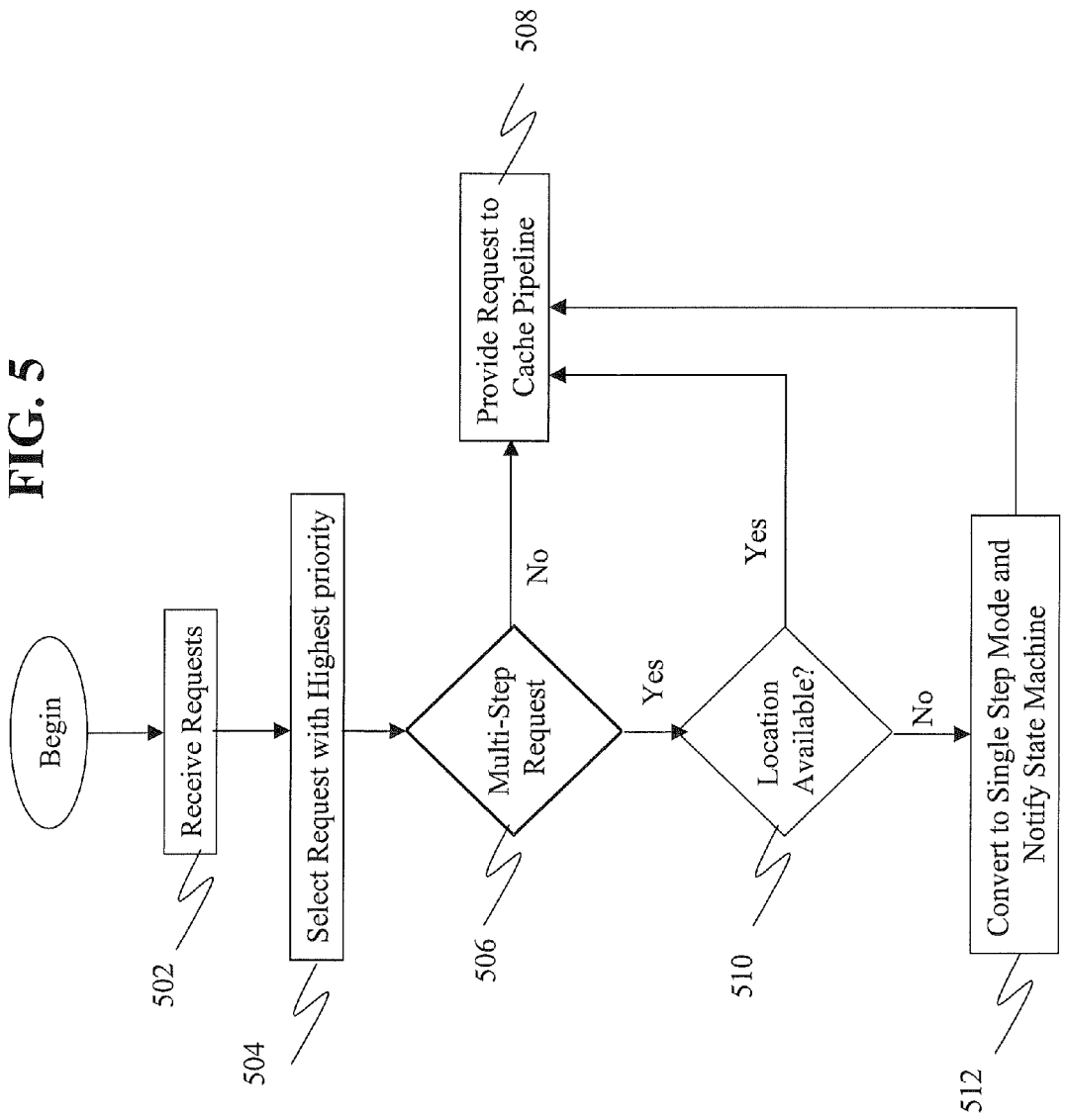
FIG. 5 depicts a method according to one embodiment of the present invention.

FIG. 5 shows a method of dynamically modifying the mode of a cache request according to one embodiment. At a block 502 shared pipeline access requests are received. It should be understood that the process of step 502 is ongoing regardless of the other processing. In one embodiment, the requests are received at an arbiter and stored in an input buffer thereof. The requests may come, for example, from one or more state machines and include a mode that indentifies the one or more steps the request requires of the cache pipeline.

At block 504 the request with highest priority is selected. Priority may be established in any manner now know or later developed.

At a block 506 it is determined if the selected request is a multi-step request that includes a cache access step. If it is not, the request is passed to the cache pipeline at a block 508. Otherwise, it is determined, by access to a line store, interleave manager, or other device, whether the location of the cache access is available at a block 510. If it is, the request is passed to the cache pipeline at block 508. Otherwise, at a block 512 the mode of the request is modified so that only the non-cache access steps are performed and the state machine is notified that it needs to request the access again. Then, the modified request is provided to the cache pipeline at block 508.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer implemented method of providing requests to a cache pipeline, the method comprising:
   receiving a plurality of requests from one or more state machines at an arbiter;
   selecting one of the plurality of requests as a selected request, the selected request having been provided by a state machine;
   determining that the selected request requests performing an access to a particular location in the cache and a coherency check;
   determining that the location in the cache is unavailable; and
   converting the selected request to a request that only includes a coherency check.

2. The method of claim 1, further comprising:
   notifying the first state machine that the selected request was converted.

3. The method claim 1, wherein the location in the cache is a cache line.

4. The method of claim 1, wherein the location in the cache is an interleave portion.

5. The method of claim 1, wherein the determination that the location in the cache is unavailable is made based on information in a line store coupled to the cache pipeline and configured to store information about the availability of cache lines in the cache.

6. The method of claim 5, wherein an arbiter coupled to the cache pipeline, the line store and the state machine, is configured to determine if the particular cache line is available and to convert the request.

7. The method of claim 1, wherein the cache is formed of embedded read only memory.

* * * * *